(12) United States Patent
Gimpel et al.

(10) Patent No.: US 7,776,933 B2
(45) Date of Patent: Aug. 17, 2010

(54) CATALYST STRUCTURE

(75) Inventors: Frederik Willem Hendrik Gimpel, CM Amsterdam (NL); Gerardus Petrus Lambertus Niesen, CM Amsterdam (NL); Franciscus Johannes Maria Schrauwen, CM Amsterdam (NL)

(73) Assignee: Shell Oil Company, Houston, TX (US)

( * ) Notice: Subject to any disclaimer, the term of this patent is extended or adjusted under 35 U.S.C. 154(b) by 573 days.

(21) Appl. No.: 11/664,487

(22) PCT Filed: Oct. 4, 2005

(86) PCT No.: PCT/EP2005/054984

§ 371 (c)(1),
(2), (4) Date: Apr. 2, 2007

(87) PCT Pub. No.: WO2006/037776

PCT Pub. Date: Apr. 13, 2006

(65) Prior Publication Data

US 2007/0299147 A1     Dec. 27, 2007

(30) Foreign Application Priority Data

Oct. 4, 2004    (EP) .................................. 04256131

(51) Int. Cl.
*C07C 27/00*    (2006.01)
(52) U.S. Cl. ...................................... 518/715; 518/700
(58) Field of Classification Search ................. 518/700, 518/715

See application file for complete search history.

(56) References Cited

U.S. PATENT DOCUMENTS

| 5,786,393 | A | 7/1998 | Chaumette et al. | 518/700 |
|---|---|---|---|---|
| 6,211,255 | B1 | 4/2001 | Schanke et al. | 518/715 |
| 6,262,131 | B1 | 7/2001 | Arcuri et al. | 518/700 |
| 2001/0021724 | A1 | 9/2001 | Arcuri et al. | 518/722 |
| 2003/0012711 | A1 | 1/2003 | Harkins et al. | 422/190 |
| 2004/0147620 | A1 | 7/2004 | Wang et al. | 518/715 |

FOREIGN PATENT DOCUMENTS

| EP | 665041 | 8/1995 |
|---|---|---|
| EP | 674608 | 10/1995 |
| WO | 2005075065 | 8/2005 |

OTHER PUBLICATIONS

Research Disclosure, Kenneth Mason Publications, Hampshire, GB, vol. 332, No. 71: "High data rate holographic storage device", published in Dec. 1991.

*Primary Examiner*—Jafar Parsa

(57) ABSTRACT

A process for the synthesis of hydrocarbons in a three phase reactor comprising the steps of: (i) introducing synthesis gas into the reactor; (ii) causing the synthesis gas to be contacted with a Fischer-Tropsch catalyst; and (iii) removing products from the reactor, wherein step (i) comprises introducing some or all of the synthesis gas into the reactor at or near the bottom of the reactor; and step (ii) comprises contacting the synthesis gas with a catalyst structure immobilised within the reactor, wherein the catalyst structure comprises one or more porous catalyst elements fixable within the reactor, each of said porous catalyst elements being at least 1 cm$^3$, preferably at least 10 cm$^3$, in size and wherein the open volume within each porous catalyst element is at least 60% (with reference to the volume of the porous catalyst elements) and each porous catalyst element includes a Fischer-Tropsch catalyst material.

22 Claims, 1 Drawing Sheet

CATALYST STRUCTURE

FIELD OF THE INVENTION

The present application claims priority to European Patent Application 04256131.6 filed 4 Oct. 2004.

The present invention relates to a catalyst structure for use in three phase bubble column reactors. In particular, the invention relates to a catalyst structure for use in Fischer-Tropsch reactions.

BACKGROUND OF THE INVENTION

The Fischer-Tropsch process can be used for the conversion of hydrocarbonaceous feed stocks into liquid and/or solid hydrocarbons. The feed stock (e.g. natural gas, associated gas and/or coal-bed methane, residual oil fractions, coal) is converted in a first step into a mixture of hydrogen and carbon monoxide (this mixture is often referred to as synthesis gas or syngas). The synthesis gas is then converted in a second step over a suitable catalyst at elevated temperature and pressure into paraffinic compounds ranging from methane to high molecular weight molecules comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi tubular fixed bed reactors, fluidised bed reactors, such as entrained fluidised bed reactors and fixed fluidised bed reactors, and slurry bed reactors such as three-phase slurry bubble columns and ebullated bed reactors.

The Fischer-Tropsch reaction is very exothermic and temperature sensitive with the result that careful temperature control is required to maintain optimum operation conditions and desired hydrocarbon product selectivity. Bearing in mind the very high heat of reaction which characterises the Fischer-Tropsch reaction the heat transfer characteristics and cooling mechanisms of a reactor are very important.

The heat transfer performance of a fixed-bed reactor is limited because of the relatively low mass velocity, small particle size and low thermal capacity of fluids. If one attempts, however, to improve the heat transfer by increasing the gas velocity, a higher CO conversion could be obtained, but an excessive pressure drop across the reactor may develop, which limits commercial viability. Increasing reactor capacity by increasing gas throughput and CO conversion may also result in increasing radial temperature gradients. For thermal stability and efficient heat removal the Fischer-Tropsch fixed-bed reactor tubes should have a diameter of less than 10 cm, preferably 7 cm or even less. The desired use of high-activity catalysts in Fischer-Tropsch fixed-bed reactors makes the situation even more challenging. The limited heat transfer performance makes local runaways (hotspots) possible, which may result in local deactivation of the catalyst. In order to avoid runaway reaction the maximum temperature within the reactor must be limited. However, the presence of temperature gradients within the reaction mixture means that some of the catalyst is operating at sub-optimal conditions.

Commercial fixed-bed and three-phase slurry reactors typically utilise boiling water to remove the heat of reaction. In the fixed-bed design, individual reactor tubes are located within a jacket containing water/steam. The heat of reaction raises the temperature of the catalyst bed within each tube. This thermal energy is transferred to the tube wall forcing the water in the surrounded jacket to boil. In the slurry design, cooling tubes are most conveniently placed within the slurry volume and heat is transferred from the liquid continuous matrix to the tube walls. The production of steam within the tubes provides the needed cooling. The steam in turn may be used for heating purposes or to drive a steam turbine.

The use of liquid recycle as a means of improving the overall performance in a fixed-bed design has been described. Such a system is also called a "trickle bed" reactor (as part of a sub set of fixed-bed reactor systems) in which both reactants gas and inert liquid are introduced (preferably a down flow orientation with respect to the catalyst) simultaneously. The presence of the flowing reactant gas and the liquid improves heat removal and temperature control thus enhancing the reactor performance with respect to CO conversion and product selectivity. A potential limitation of the trickle bed system (as well as any of the fixed-bed designs) is the pressure drop associated with operating at high mass velocities. The gas-filled voidage in fixed-beds (typically less than 0.50) and size and shape of the catalyst particles does not permit high mass velocities without excessive pressure drops. Consequently, the conversion rate per unit reactor volume is limited by heat removal and pressure drop. Increasing catalyst particle size and higher mass flow rates improve heat transfer rates for a given pressure drop. However, the loss of catalyst selectivity and lower catalyst efficiency may make this unattractive.

Three-phase slurry bubble column reactors potentially offer advantages over the fixed-bed design in terms of heat transfer performance. Such reactors typically incorporate small catalyst particles in a liquid continuous matrix. The synthesis gas is bubbled through, maintaining suspension of the catalyst particles and providing the reactants. In the case of multi-tubular reactors, the number of tubes incorporated is generally limited by mechanical parameters. The motion of the continuous liquid matrix promotes heat transfer to achieve a high commercial productivity. The catalyst particles are moving within a liquid continuous phase, resulting in efficient transfer of heat generated by the catalyst particles to the cooling surfaces. The large liquid inventory in the reactor provides a high thermal inertia, which helps prevent rapid temperature increases that can lead to thermal runaway.

Catalyst particles must be removed from the reaction products, as at least part of the reaction products are in the liquid phase under reactor conditions. This separation is typically carried out using an internal or external filtration system. Other issues associated with the use of suspended catalyst particles are non-uniform distribution of catalyst throughout the reactor (with knock-on effects on cooling) and catalyst attrition.

U.S. Pat. No. 6,262,131B1 discloses a "structural" Fischer-Tropsch catalyst disposed in a reactor with a certain voidage ratio, generally being a truncated or fragmented randomly packed arrangement.

U.S. Pat. No. 6,211,255B1 discloses a monolithic catalyst. The monolith has channels, but could still prevent random and turbulent flow generally desired in a Fischer-Tropsch reactor to ensure good mixing of the reactants.

SUMMARY OF THE INVENTION

Accordingly, the present invention provides a process for the synthesis of hydrocarbons in a three phase reactor comprising the steps of:
(i) introducing synthesis gas into the reactor; and
(ii) causing the synthesis gas to be contacted with a Fischer-Tropsch catalyst; and
(iii) removing products from the reactor, wherein step (i) comprises introducing some or all of the synthesis gas into the reactor at or near the bottom of the reactor; and step (ii) comprises contacting the synthesis gas reactants with a catalyst structure immobilised within the reactor, wherein the catalyst structure comprises one or more porous catalyst elements fixable within the reactor, each of said porous catalyst elements being at least 1 cm$^3$, preferably at least 10 cm$^3$, in size and wherein the open volume within each porous catalyst element is at least 60% (with reference to the volume of the porous catalyst elements) and each porous catalyst element includes a Fischer-Tropsch catalyst material.

BRIEF DESCRIPTION OF THE DRAWINGS

The FIGURE is a schematic illustration of a catalyst structure of the invention within a reactor.

DETAILED DESCRIPTION OF THE INVENTION

Figure 1:
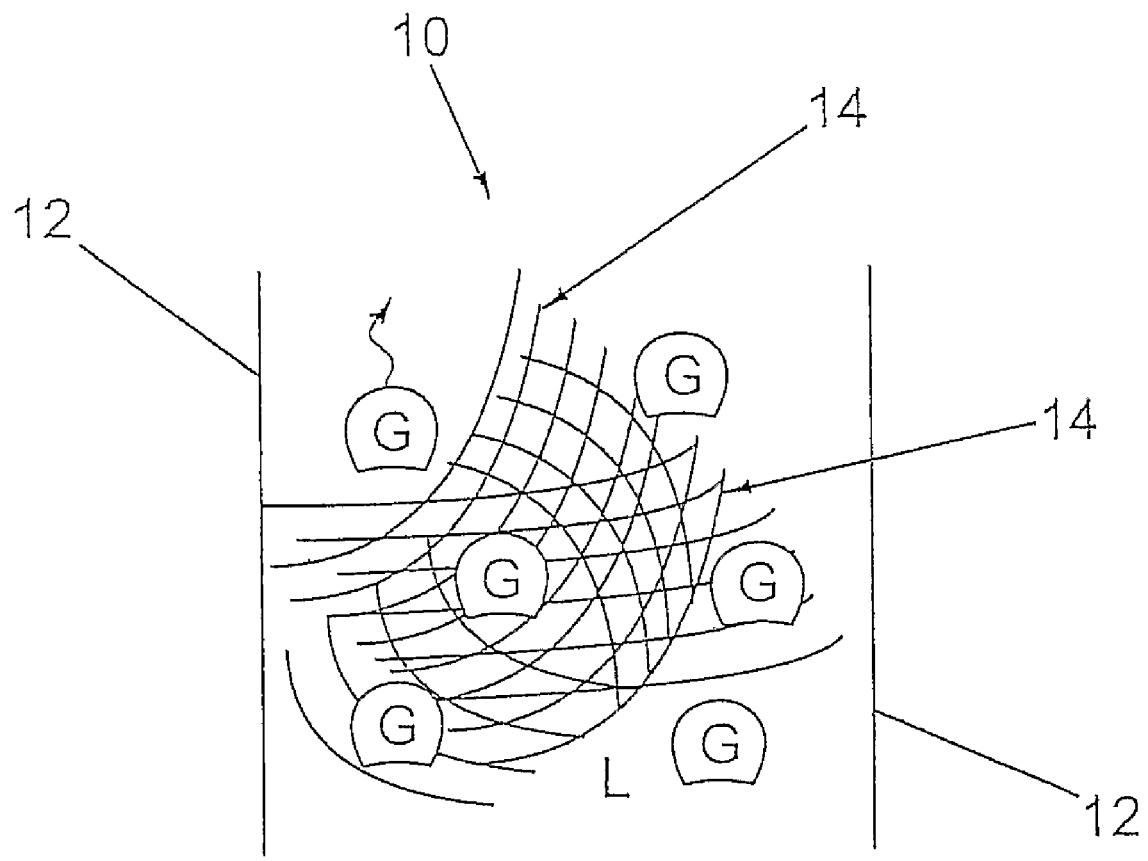

In a preferred embodiment the catalyst structure comprises one or more one porous catalyst elements fixable within the reactor, each of said porous catalyst elements being at least about 1 cm$^3$, preferably at least about 10 cm$^3$, in size. The maximum size of the catalyst elements may be up till several meters or even more in one or more directions. For instance woven or non-woven metal structures in the shape of large blankets may be used which suitably can be placed between several rows of cooling tubes. Such blankets may have dimensions from 2 to 10 m by 0.5 to 2 m at a thickness of 1-10 cm. The catalyst may also be in the form of rolled up blankets, e.g. cylinders of 2 to 10 m long with a diameter between 10 and 50 cm. One or more cooling tubes may be present in such a cylinder, especially at least one cooling tube in the center of the cylinder. The size usually is between 0.001 m$^3$ and 10 mm$^3$, suitably between 0.01 m$^3$ and 8 m$^3$, preferably between 0.1 and 5 m$^3$.

It is observed that the three phase reactor according to the present invention comprises one immobilised phase (the immobilised catalyst structure) and two mobile phases (the gas phase and the liquid phase). The liquid phase is a continuous phase (i.e. the reactor will usually be filled up for a substantial part (e.g. at least 25 vol %) with liquid). The gas phase is a discontinuous phase, i.e. it is made up of large amounts of smaller and larger gas bubbles.

As the gas is introduced at or near the bottom, the gas phase riser in bubbles to the top part of the reactor. The reactor preferably comprises a freeboard zone (on top of the liquid phase zone). In the freeboard zone a separator is obtained between the gas phase and the liquid phase.

The synthesis gas is introduced at or near the bottom of the reactor. It may be introduced at one or more places. Preferably more introduction points are used in larger reactors. Separate spargers may be used. In general 1-4 spargers are used per m$^2$ reactor diameter. Also one or more perforated plates can also be used. Preferably all syngas is introduced in the reactor at or near the bottom. It is preferred to introduce all synthesis gas below the catalyst structure. Products are removed from the reactor. One or more gas outlets can be used at or near the top of the reactor, these outlets communicating with the freeboard zone if present. The liquid product may be removed directly from the liquid zone, preferably in the middle of the slurry zone or below.

The size of the reactor may vary over a wide range. The diameter is suitably at least 0.1 m, more suitably at least 0.5 m. Preferably the size is between 1 and 10 m, more preferably between 4 and 8 m. The height of the reactor is suitably at least 2 m, preferably 10 m. Preferably the height is between 20 and 100 m, more preferably between 40 and 75 m.

The porous catalyst elements are suitably fixed in the reactor. This may be done by fixing means, e.g. perforated plates, wires, pins, pipes, gazes, clamps, springs etc. The porous elements may be fixed against the reactor walls and/or the cooling tubes. Each element may be fixed separately or together with a number of elements. Especially when relatively small elements are used, the elements may be fixed in e.g. baskets, containers etc. Very suitably they may be fixed using horizontal sieve plates or perforated plates extending over the whole diameter of the reactor. Separate elements may have means which fix two or more elements together, e.g. dovetails.

During the reaction, the liquid phase will be expanded when compared with the liquid phase before the introduction of synthesis gas. The gas hold-up in the expanded liquid column is suitably between 10 and 70%, preferably between 25 and 55%. Preferably the catalyst elements are immersed in the liquid before start-up of the reaction.

In a preferred embodiment each porous catalyst element has a material selected from the group consisting of porous catalyst element gauze, sponge, foam, foil construct and woven mat form, or any combination of these. The porous catalyst elements may suitably be made from refractory oxides; for example $TiO_2$, $SiO_2$, alumina; metals, for example stainless steel, iron or copper; or any similar inert material capable of withstanding conditions within the reaction vessel, preferably stainless steel.

The catalyst elements do not comprise honeycombs and/or monoliths or any other forms which are fully closed in one or more directions. Preferably open structures are used, especially gauzes, sponges or woven structures, especially mats. The open structure in all directions support an almost undisturbed flow of gas and liquid. In that way corrective transport of gas and liquid is possible in all directions.

Preferably the porosity between porous catalyst elements is less than 30% by volume, more preferably less than 20% by volume and most preferably less than 10% by volume with reference to the volume of the porous catalyst elements and the space thereinbetween.

Preferably the open volume within the porous catalyst element (catalytic material plus carrying structure) is at least 60%, more preferably at least 70% and even more preferably at least 75% (with reference to the volume of the porous catalyst element). Very suitably the open volume is between 80 and 85%. The open volume is preferably made up by relatively large pores, i.e. pores excluding pores with a diameter less than 100 microns, more preferably less than 250 microns, still more preferably less than 500 microns. Very suitably the pore have a diameter of at least 1 mm, more preferably 2 mm.

Preferably the direction of the pores are equally distributed over all directions, in order to maximise gas and liquid transport. The porosity of a catalyst elements can easily be measured, for instance by introducing the element in molten wax, followed by solidification of the wax and cutting the hard wax into one or more layers. The ratio of wax area on the total area results in the porosity.

In a further embodiment the tortuosity of the catalyst element is suitably less than 3, more suitably less than 2. Preferably the tortuosity is less than 1.5, more preferably less than 1.3, even more preferably less than 1.2. The optimum tortuosity is between 1.01 and 1.1. The tortuosity is the ratio between the actual path length from a certain point to another point (i.e. the length a molecule has to travel while evading the carrier structure) and the shortest distance between those two points (i.e. neglecting and obstructions). The tortuosity can be measured approximately by radioactive tracer tests, by the use of the solidified wax layers as described above by measuring the length of the path through the centre of the pores. Preferably the tortuosity is measured through pressure drop comparisons with structures having a known tortuosity. The open structure of the catalyst element, i.e. the high porosity, in combination with the low tortuosity result in an almost unhindered movement of gas and liquid through the reactor.

Preferably the specific surface area of the porous catalyst element (carrying structure) is between from 200 to 20,000 $m^2$ per $m^3$ and preferably from 200 to 15,000 $m^2$ per $m^3$ (with reference to the volume of the porous catalyst element).

Preferably the Fischer-Tropsch catalyst material is applied as a layer to each porous catalyst element, typically in a thickness of from 1 to 300 microns and preferably from 5 to 200 microns, more preferably from 20 to 150 micron.

It is preferred that the catalyst fraction i.e. the total amount of catalytic material and carrier therefore applied to the carrying structures of the porous catalyst element is at least about 1% by volume and preferably greater than about 4% by volume (with reference to the volume of the porous catalyst elements). Suitably the catalyst fraction is between 6 and 18% by volume, more suitably between 8 and 15% by volume.

Preferred Fischer catalyst materials include cobalt, iron, ruthenium and mixtures thereof.

Preferred promoters or co-catalysts include zirconium, maganese, vanadium and mixtures thereof.

In a preferred embodiment the immobilised catalyst element comprises about 20% by weight cobalt and the catalyst material is present in an amount of 20 to 120 kg Co $m^{-3}$ and more preferably 20 to 90 kg Co $m^{-3}$ (the reference volume is the envelope around the porous catalyst element) (the volume, $m^{-3}$, element being in relation to the envelope around the porous catalyst element).

Preferably the reactants are hydrogen and carbon monoxide, typically fed into the slurry reactor at a molar ratio in the range of from 0.4 to 2.5 and preferably at a molar ration of 1.0 to 2.3.

The present invention also provides for a reactor for carrying out an exothermic reaction comprising a reactor shell, means for introducing reactants into the reactor shell, one or more catalytic structures, cooling means and means for removing products from the reactor shell; wherein at least one of the catalytic structures comprises at least one porous catalyst element immobilised with respect to the reactor shell, each catalyst element being at least 1 cm3, preferably at least 10 cm3 in size and wherein the open volume within each porous catalyst element is at least 60% (with reference to the volume of the porous catalyst elements) and each porous catalyst element includes a Fischer-Tropsch catalyst material. The means for introducing the reactants into the reactor are suitably situated at or near the bottom of the reactor. Due to the very open catalyst structure, the reactor very much resembles an upflow, two phase gas bubble column.

The catalyst structure of the present invention eliminates the need for a catalyst/product separation system and enables dry (gas phase) catalyst activation. The presence of a porous substrate may improve uniformity of gas distribution within the reactor and assures uniform distribution of catalyst.

In a preferred embodiment the catalyst elements are fixed against the cooling tubes of the reactor. This gives the possibility to fix the elements to the cooling tubes outside the reactor, followed by introduction of the cooling tubes and the catalyst structure into the reactor. This is an especially preferred embodiment when a plurality of modular cooling tubes are used inside one reactors. Such an arrangement is described in WO 2005/075065, the contents of which are included in this application by way of reference. In this embodiment woven or non-woven blankets may be fixed between rows of cooling tubes. In addition one (or more) layers may be fixed around the complete module. It is also possible put a screen around the cooling module (e.g. at a few cm from the outer tubes) and to fill the space around and between the cooling tubes with relative small elements, e.g. sponges or gauzes. In the above arrangement the removal of the elements is relatively simple as it can be done by removing the cooling modules together with the elements from the reactor. Removal of the old elements and replacement by new elements can be done than relatively easy outside the reactor. A further improvement may be obtained by fixing in addition catalyst elements against the inside of the reactor shell. Once at least part of the cooling modules are removed from the reactor, the inside of the reactor shell is relatively easy accessible.

Without wishing to be restricted to a particular embodiment, the invention will now be described in further detail with reference to the drawings in which:

FIG. 1 is a schematic illustration of a catalyst structure of the invention within a reactor.

FIG. 1 illustrates an catalyst structure 10 located in a slurry reactor between two cooling surfaces 12. The syngas introduced at the bottom of the reactor bubbles upwards through the reaction mixture and the catalyst structure. (Syngas bubbles are designated G and liquid wax products are designated L in FIG. 1.)

The catalyst structure 10 is provided by a number of support wires 14, onto which is coated a catalyst material as hereinafter described.

The catalyst structure of the invention is suitable for slurry reactions, such as for example Fischer-Tropsch type reactions. Suitable slurry liquids are known to those skilled in the art. Typically, at least a part of the slurry liquid is a reaction product of the exothermic reaction. The reaction mixture typically comprises synthesis gas and hydrocarbon feedstock reactants and liquid hydrocarbon products. The approach taken in the present invention combines the benefits of both fixed bed technology and slurry technology in a novel gas to liquid reactor concept that has significant advantages over the prior art. The present invention circumvents the disadvantages of fixed bed multi-tubular reactor technology (such as limited catalyst utilisation due to mass transport limitation within catalyst particles, heat removal limited by transport through the catalyst bed, the expense of this type of reactor and high pressure drop) and the disadvantages of slurry reactor technology such as non-uniform axial catalyst hold-up, catalyst attrition, the need for filtration means for separation of small catalyst particles from the product wax and catalyst entrainment.

The concept upon which the present invention is based is as follows: immobilisation of the catalyst (i.e. transferring the suspension function from the liquid phase to a dedicated inert fourth phase which is acting as a support) combines the benefits of fixed bed technology with the benefits of slurry technology. According to the present invention a slurry reactor is loaded with one or more porous catalyst elements comprising a suitable catalyst material. Each porous catalyst element may comprise a plurality of sub-elements.

The concept of utilizing porous catalyst structures comprising porous catalyst elements, each of which is coated with a catalyst material introduces three distinct levels of porosity into the system. First, there is macro-porosity between separate porous catalyst elements within a reactor. Secondly, structure and arrangement of porous catalyst elements introduces an intermediate level of porosity. Finally, the catalyst material of each porous catalyst element represents a third, micro-porous, level.

Gas/liquid phase flow characteristics within the reactor may be optimised to maximise mass transfer of reactants and heat transfer between the reactants and the catalyst material by modifying the configuration of the porous catalyst elements. For example the porous catalyst elements may be stacked in a uniform manner within the reactor, or alternatively, they may be configured in a more or less random fashion. For any given reactor set up a certain amount of the reactor shell volume will be taken up by the cooling means. Preferably, the configuration of porous catalyst elements is integrated with the cooling tubes (or other cooling means) within the reactor so as to maintain favourable cooling capability while at the same time maximising overall porosity of the catalyst structure. Typically the porous catalyst elements are at least 1 $cm^3$ and preferably at least 10 $cm^3$ in size.

The provision of porous catalyst elements fixable throughout the reactor volume allows a predetermined catalyst (hold-up or activity) gradient to be set up. For example porous catalyst elements at different heights within the reactor may comprise different concentrations of catalyst. Alternatively, each porous catalyst element may be manufactured such that the catalyst concentrations varies along its length. Furthermore, different porous catalyst elements within the reactor may contain different catalyst materials for example, a porous catalyst element towards the bottom of the reactor may comprise a cobalt catalyst while a porous catalyst element towards the top of the reactor may comprise an iron catalyst material.

Variation in the size and/or shape of the porous catalyst elements may be used to guide movement of reactant and product materials within the reactor. For example, it may be advantageous to have a relatively more open structure at the top of the reactor and a relatively closed structure towards the bottom of the reactor, or vice versa. Additionally, it is envisaged that a number of porous elements (not comprising a catalyst material) may be provided close to the point of entry of syngas into the reactor as a means of assisting gas distribution throughout the reactor volume.

The porous catalyst elements are fixable within the reaction vessel. For example one or more porous catalyst elements may be secured to other components (e.g. the cooling tubes) within the reactor or to the sides of the reactor itself. Alternatively, the porous catalyst elements may be placed in spaces within the reactor with some securing means fixing them in place to prevent movement during use. In one preferred embodiment the porous catalyst elements are reversibly attached to cooling tubes. In another preferred embodiment porous catalyst elements are situated in spaces between cooling tubes with a grid or other fixing means being employed to prevent movement of the porous catalyst elements. The catalyst structure is immobilised or fixed within the reactor shell during operation.

Each porous catalyst element may be made of any chemically inert material which has the appropriate physical characteristics to withstand conditions within the reactor and which exhibits the required degree of porosity once coated with a catalyst material. The substrate may comprise a wire gauze, mesh or webbing material. Suitably, the porosity of each porous element is isotropicably, i.e. the porosity along each of the x, y, or z direction are the same. Thus, the porosity (expressed as the percentage open volume of total volume of a catalyst element) in each of the x, y or z direction differs (in the same percentages) less than 30% from each other, preferably less than 20%, more preferably less than 10%.

The catalyst material may for example be a heavy paraffin synthesis catalyst such as those known to the person skilled in the art. Several suitable catalyst materials are exemplified below. The catalyst material is applied to the porous substrate as a thin layer. The catalyst layer should be sufficiently thin to avoid diffusional mass transport limitation (decrease of CO and or hydrogen partial pressure and/or unfavourable change of the hydrogen/carbon monoxide-ratio within the catalyst layer) of the syngas components within the catalyst layer. Thickness of the catalyst layer can be increased up to the onset of mass transport limitation. There is no upper limit to the thickness of the catalyst layer onto the gauze other than mass transport limitation and voidage of the substrate for hydrodynamic reasons. This provides additional freedom in comparison to a slurry reactor, where the size/density of the slurry catalyst particles imposes an upper limit to the size (with too high a settling velocity resulting from a particle size which is too large and which causes non-uniform catalyst hold-up along the height of the reactor).

In relation to the geometry of the catalyst structure it is desirable to have gas/liquid hydrodynamics such that the high heat transfer coefficients from process side to cooling surface of a gas-liquid bubble column or three-phase gas/liquid/suspended catalyst system, are retained or at least approached. Liquid mixing may be enhanced by the structure of the catalyst structure.

Liquid movement and mixing within the reactor is an important aspect of the invention. The liquid product wax provides bulk transport of syngas components to the catalyst surface. The liquid phase is also the main carrier of generated process heat from the catalyst to the cooling means. Mixing of the liquid phase and movement of the liquid along the walls of the cooling elements is generated by the gas (syngas in addition to light hydrocarbon products in the vapour phase) rising through the liquid filled voids in the catalyst structure.

In relation to the geometry of the immobilised catalyst structure it is desirable to have gas/liquid hydrodynamics such that high mass transfer coefficients for transfer of hydrogen and carbonmonoxide from the gas phase to the liquid phase are achieved. A reactor containing the catalyst structure of the invention can be configured such that there are no significant gas-to-liquid or liquid-to-gas mass transport limitations during operation. The combination of gas distribution, gas-liquid interfacial area, mass transfer coefficients and liquid mixing should insure near saturation of the bulk liquid with syngas anywhere within the catalyst elements (e.g. gauze/sponges). The gas also serves as the main driver for liquid convection and mixing, insuring effective transport of heat through the cooling means and thus a uniform temperature profile. Liquid convection can be optimised within the dimensional scale of the porous substrate of the catalyst structure.

A further advantage of the catalyst structure is that the liquid phase does not suffer from the increase of apparent viscosity due to the presence of catalyst particles (which cause deterioration in radial liquid mixing and mass transfer).

The catalyst inventory or the mass of catalyst material per unit volume (reference volume being the gross volume of the gas/liquid catalyst structure in the reactor shell) of the catalyst structure should be maximised in comparison to the reactor shell volume.

The exothermic reaction is a reaction which is carried out in the presence of a solid catalyst. Typically, at least one of the reactants of the exothermic reaction is gaseous. Examples of exothermic reactions include hydrogenation reactions, hydroformylation, alkanol synthesis, the preparation of aromatic urethanes using carbon monoxide, Kölbel-Engelhardt synthesis, polyolefin synthesis, and Fischer-Tropsch synthesis. According to a preferred embodiment of the present invention, an exothermic reaction is a Fischer-Tropsch synthesis reaction.

The Fischer-Tropsch synthesis is well known to those skilled in the art and involves synthesis of hydrocarbons from a gaseous mixture of hydrogen and carbon monoxide, by contacting that mixture at reaction conditions with a Fischer-Tropsch catalyst. Suitable slurry liquids are known to those skilled in the art. Typically, at least a part of the slurry liquid is a reaction product of the exothermic reaction. Preferably, the slurry liquid is substantially completely a reaction product (or products).

Examples of products of the Fischer-Tropsch synthesis (for a low temperature Co based system) may range from methane to heavy paraffinic waxes. Preferably in the case of a Co based catalyst, the production of methane is minimised and a substantial portion of the hydrocarbons produced have a carbon chain length of at least 5 carbon atoms. Preferably, the amount of $C_5$+hydrocarbons is at least 60% by weight of the total product, more preferably, at least 70% by weight, even more preferably, at least 80% by weight, most preferably at least 85% by weight.

Fischer-Tropsch catalysts are known in the art, and typically include a Group VIII metal component, preferably cobalt, iron and/or ruthenium, more preferably cobalt. Typically the porous catalyst element and each porous catalyst element comprise a carrier material such as a porous inorganic refractory oxide, preferably alumina, silica, titania, zirconia or mixtures thereof.

The optimum amount of catalyst material present depends inter alia on the specific catalytically active metal. The catalyst material is typically coated onto each porous catalyst element in a layer having a thickness of from about 1 to about 300 µm and preferably from about 5 to about 200 µm. Typically, the catalyst fraction of each porous catalyst element is at least about 1% by volume and preferably at least about 4% by volume. An immobilized catalyst structure according to the invention preferably comprises about 20% by weight catalyst material. In a preferred embodiment the immobilized catalyst structure comprises cobalt in an amount of from about 10 to about 120 kg m$^{-3}$, preferably in an amount of from about 20 to about 90 kg m$^{-3}$.

The catalytically active material may be present together with one or more metal promoters or Co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, maganese and/or vanadium. As an alternative or in addition to the metal oxide promoter, the catalyst may comprise a metal promoter selected from Groups VIIIB and/or VIII of the Periodic Table. Preferred metal promoters include rhenium, platinum and palladium.

A most suitable catalyst material comprises cobalt and zirconium as a promoter. Another most suitable catalyst comprises cobalt and maganese and/or vanadium as a promoter.

The promoter, if present, is typically present in an amount of from 0.1 to 60 parts by weight per 100 parts by weight of carrier material and preferably from 0.5 to 40 parts by weight per 100 parts of carrier material. It will however be appreciated that the optimum amount of promoter may vary for the respective elements which act as promoter.

Increasing the overall porosity of the immobilized catalyst structure enhances the conversion rate by minimizing the chances of syngas passing through to the top of the reactor without encountering the catalyst material. The porosity between porous catalyst elements within the catalyst structure is typically less than 30% by volume, preferably less than 20% by volume and more preferably less than 10% by volume, of the structure (i.e. with reference to the overall volume of porous catalyst elements and the spaces thereinbetween).

The open volume within each porous catalyst element must be sufficient to facilitate efficient through-flow of reactants, while at the same time the specific surface area of each porous catalyst element should be as large as possible to increase exposure of reactants to the catalyst material. Typically said open volume is at least 60%, preferably at least 70% and more preferably about 75% (with reference to the overall volume of porous catalyst elements and the spaces thereinbetween). Typically said specific surface area is between from about 200 to about 20,000 m2 preferably between from about 300 to about 15,000 m2 (with reference to the overall volume of porous catalyst elements and the spaces thereinbetween).

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the slurry reactor at a molar ratio in the range from 0.4 to 2.5. Preferably, the hydrogen to carbon monoxide molar ratio is in the range from 1.0 to 2.5.

The conditions to be used in the process according to the invention very much resemble the conditions in a two phase bubble column reactor. The hydrodynamical properties of the reactor according to the invention are very similar to a gas/liquid bubble column reactor. This is obtained by the very open structure of the catalyst structure, especially the very open structure within the catalyst elements in all directions. The pressure drop of the reactor according to the invention will be the static pressure of the reactor plus 2 bar, preferably the static pressure plus 1 bar, more preferably the static pressure plus 0.5 bar. This is more or less equivalent to a (slurry) bubble column.

The gaseous hourly space velocity, may vary within wide ranges and is typically in the range from 500 to 20,000 Nl/l/h preferably in the range from 700 to 10,000 Nl/l/h (with reference to the volume of porous catalyst elements and the spaces thereinbetween).

Preferably, the superficial gas velocity of the synthesis gas is in the range from 0.5 to 50 cm/sec, preferably in the range from 5 to 35 cm/sec, more preferably from 10 to 30 cm/sec, with reference to the cross section of the catalyst structure (i.e. the cross section of the reactor minus the cross section occupied by the cooling tubes and any other internal components). The Peclet number of the gas phase is suitably at least 0.1 m$^2$/s, preferably 0.2 m$^2$/s, more preferably 0.5 m$^2$/s. The Peclet number can be calculated from the dispersion coefficient of the gas phase, which dispersion coefficient can be measured for instance by using radioactive tracer experiments. See for instance L-S. Fan, Gas-Liquid-Solid Fluidization Engineering (1989), Chapter 4. In the case that the Peclet number is too low, the slurry height may be increased and/or the gas velocity may be increased. Compartmentation of the reactor is a further possibility.

The reaction is preferably carried out in the coalesced bubble regime. This regime will occur at superficial gas velocities of at least 7 cm/s, preferably 10 cm/s, at column diameter of at least 25 cm, preferably at least 40 cm/s.

Typically, the superficial liquid velocity is kept in the range from 0.001 to 4.00 cm/sec, including liquid production. It will be appreciated that the preferred range may depend on the preferred mode of operation.

According to one preferred embodiment, the superficial liquid velocity is kept in the range from 0.005 to 1.0 cm/sec.

It will be understood that the skilled person is capable of selecting the most appropriate conditions for a specific reactor configuration and reaction regime.

We claim:

1. A process for the synthesis of hydrocarbons in a three phase bubble column reactor comprising the steps of:
   (i) introducing synthesis gas into the reactor;
   (ii) causing the synthesis gas to be contacted with a Fischer-Tropsch catalyst; and
   (iii) removing products from the reactor,
   wherein step (i) comprises introducing some or all of the synthesis gas into the reactor at or near the bottom of the reactor; and step (ii) comprises contacting the synthesis gas with a catalyst structure immobilised within the reactor, wherein the catalyst structure comprises one or more porous catalyst elements fixable within the reactor, each of said porous catalyst elements being at least 1 cm$^3$ in size and wherein the open volume within each porous catalyst element is at least 60% with reference to the volume of the porous catalyst elements and each porous catalyst element includes a Fischer-Tropsch catalyst material,
   wherein each porous catalyst element has a gauze, sponge, foil construct or woven mat form that is open in all directions, and wherein the tortuosity of the catalyst element is less than 1.5.

2. A process according to claim 1 wherein each porous catalyst element is formed from a material selected from the group consisting of refractory oxides, metals or mixtures thereof.

3. A process according to claim 1 wherein a plurality of porous catalyst elements are used and wherein the porosity between porous catalyst elements within the catalyst structure is less than 30% by volume of the structure.

4. A process according to claim 1 wherein the open volume within each porous catalyst element is at least 70%.

5. A process according claim 1 wherein the specific surface area of each porous catalyst element is from 200 to 20,000 m$^2$ per m$^3$ with reference to the volume of the porous catalyst element.

6. A process according to claim 2 wherein the Fischer-Tropsch catalyst material is applied as a layer to each porous catalyst element.

7. A process according to claim 1 wherein the catalyst fraction of each porous catalyst element is at least about 1% by volume with reference to the volume of the porous catalyst element.

8. A process according to claim 1 wherein the active component of the Fischer-Tropsch catalyst material is selected from the group consisting of cobalt, iron, ruthenium and mixtures thereof.

9. A process according to claim 1 wherein step (ii) further comprises the use of a promoter.

10. A process according to claim 1 wherein the Fischer-Tropsch catalyst material is cobalt and is present in an amount of 10 to 120 kg Co m$^{-3}$ with reference to the envelope around the porous catalyst element.

11. A process according to claim 1 wherein the reactants are hydrogen and carbon monoxide fed into the reactor at a molar ratio in the range of from 0.4 to 2.5.

12. A process according claim 1 wherein the gaseous hourly space velocity is in the range from 500 to 20,000 Nl/l/h with reference to the volume of the porous catalyst elements and the spaces therebetween.

13. A process according to claim 1 wherein the superficial gas velocity of the synthesis gas is in the range of from 0.5 to 50 cm/sec.

14. A process according to claim 1 wherein Fischer-Tropsch synthesis is carried out at a temperature in the range of from 125 to 350° C., and a pressure of from 5 to 150 bar abs.

15. A process for the synthesis of hydrocarbons according to claim 1 further comprising a hydro-treatment step.

16. A process according to claim 1 wherein each of the porous catalyst elements is at least 10 cm$^3$ in size.

17. A process according to claim 1 wherein each porous catalyst element is formed from a refractory oxide material or metal selected from the group consisting of titania, silica, zirconia, alumina, stainless steel, iron, copper and mixtures thereof.

18. A process according to claim 3 wherein the porosity between porous catalyst elements is less than 10% by volume.

19. A process according to claim 6 wherein the layer has an average thickness of from 1 to 300 microns.

20. A process according to claim 9 wherein the promoter is selected from the group consisting of zirconium, manganese, vanadium, rhenium, platinum, palladium and mixtures thereof.

21. A process according to claim 1 wherein the superficial liquid velocity is kept in the range of from 0.001 to 4.00 cm/sec, including liquid production.

22. A process according to claim 1 wherein the tortuosity of the catalyst element is less than 1.2.

* * * * *